Oct. 17, 1967

G. R. RABUSE ET AL 3,347,362
PRESSURE SENSITIVE ADHESIVE TAPES WITH
ANTI-STATIC EDGE COATINGS
Filed Sept. 28, 1964

FIG. 1

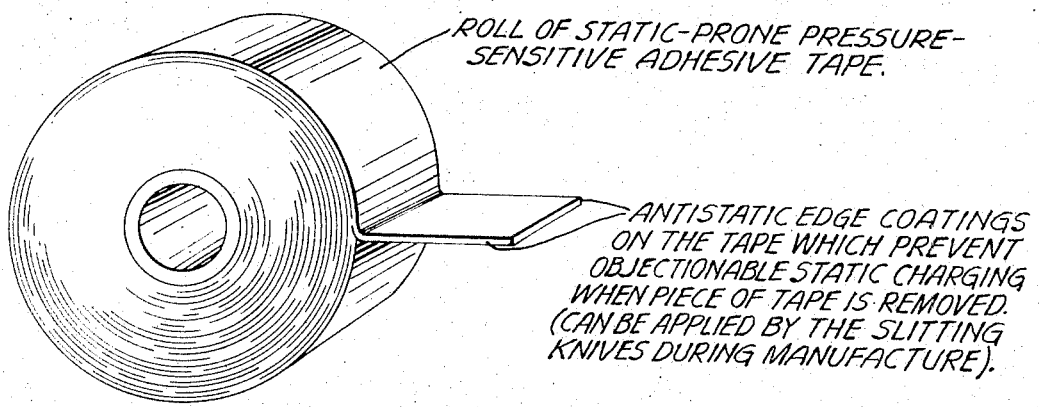

ROLL OF STATIC-PRONE PRESSURE-SENSITIVE ADHESIVE TAPE.

ANTISTATIC EDGE COATINGS ON THE TAPE WHICH PREVENT OBJECTIONABLE STATIC CHARGING WHEN PIECE OF TAPE IS REMOVED. (CAN BE APPLIED BY THE SLITTING KNIVES DURING MANUFACTURE).

FIG. 2

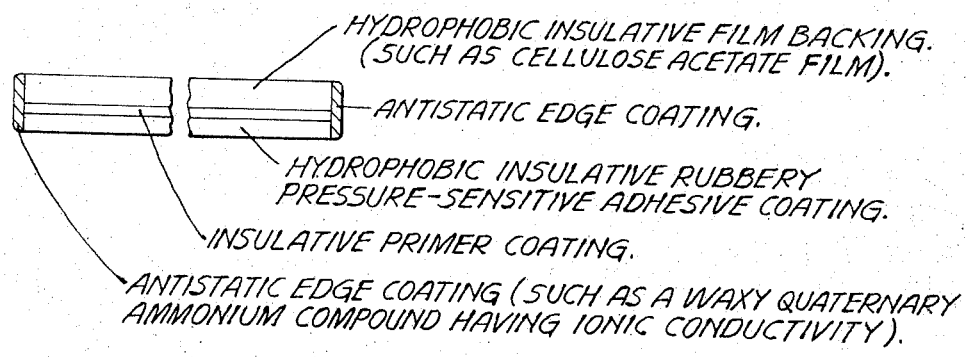

HYDROPHOBIC INSULATIVE FILM BACKING. (SUCH AS CELLULOSE ACETATE FILM).

ANTISTATIC EDGE COATING.

HYDROPHOBIC INSULATIVE RUBBERY PRESSURE-SENSITIVE ADHESIVE COATING.

INSULATIVE PRIMER COATING.

ANTISTATIC EDGE COATING (SUCH AS A WAXY QUATERNARY AMMONIUM COMPOUND HAVING IONIC CONDUCTIVITY).

INVENTORS
GEORGE R. RABUSE
ALFRED J. WALLNER
CRAIG A. STERLING
BY
Carpenter, Abbott, Coulter & Kinney
ATTORNEYS 3,347,362
PRESSURE SENSITIVE ADHESIVE TAPES WITH ANTI-STATIC EDGE COATINGS
George R. Rabuse, Sunfish Lake, Alfred J. Wallner, Roseville, and Craig A. Sterling, North St. Paul, Minn., assignors to Minnesota Mining and Manufacturing Company, St. Paul, Minn., a corporation of Delaware
Filed Sept. 28, 1964, Ser. No. 399,431
9 Claims. (Cl. 206—59)

This invention relates to the problem of preventing or reducing the electrostatic charging of certain kinds of tacky adhesive tapes and sheets when unwound and removed from the roll.

Our invention solves this problem by utilizing antistatic edge coating means on the wound adhesive tape or sheet.

In the accompanying schematic drawing, FIG. 1 shows a roll of film-backed pressure-sensitive adhesive tape provided with antistatic edge coatings and FIG. 2 shows a greatly enlarged sectional diagram of a typical tape having the various layers and coatings designated by the legends. Although both edges of the tape are coated in this illustration, and this is generally preferred, a coating on only one edge can be usefully effective, particularly in the case of adhesive tapes of narrow width (¼ to 1 inch). The primer coating of the FIG. 2 construction is sometimes omitted, especially if the backing film carries a low-adhesion backsize (thus reducing the force needed for unwinding the tacky tape).

The untreated pressure-senstive adhesive tape, to which this invention pertains, comprises a water-insoluble hydrophobic rubbery viscoelastic normally and aggressively tacky pressure-sensitive adhesive coating united to a thin hydrophobic film backing, such as a plasticized cellulose acetate film, or a rigid polyvinyl chloride film, or a polyester film. A primer coating may be interposed between the adhesive coating and the backing film. The backing film may have a low-adhesion backsize coating and in this case the backsize provides the exposed surface of the backing. All of these layers or coatings are electrically insulative. The tape is wound upon itself in roll form so that the insulative facing surface of the tacky rubbery adhesive layer is in removable adherent contact with the insulative facing surface of the backing film (which is provided by the backsize when present). These surfaces are chemically different. Force is required to pull the surfaces apart and unwind the tape.

When a length of such untreated adhesive tape is unwound from the roll and severed, the resultant piece of tape is found to be electrostatically charged. This is so even if the roll had been exposed to a humid atmosphere. When no more than one convolution of tape is unwound, charging occurs only on the adhesive side. When a longer strip is unwound, a portion will also be charged on the film side where separation from overlying adhesive occurred. In any event the charging is not uniform and random reversals of polarity may occur along a surface.

The charged piece of tape is often difficult to handle since it has an attraction to neighboring objects and has a tendency to twist and curl. Portions of opposite polarity are attracted to each other and portions of like polarity repel each other. When a charged tape is being positioned above a loose piece or edge of paper, the paper may jump up and become prematurely stuck to the tacky tape. The thinner the tape, the greater the difficulty in handling. All of these difficulties are accentuated by the aggressively tacky nature of the tape.

This problem does not arise with tape having a conductive foil or film backing; not even when the back surface is covered with an insulative low-adhesion backsize coating. A cellophane tape backing is sufficiently conductive under normal conditions to prevent static charging. Nor does it arise when the adhesive layer is conductive. The problem can also be met by employing an interposed conductive primer coating as described in the patent of two of us, Wallner and Sterling, No. 3,146,882 (Sept. 1, 1964).

The use of conductive antistatic surface coatings and sizings (often referred to as "antistat" compositions) has long been known in the textile, film and plastics arts. Such surface treatment may greatly reduce or eliminate the formation and retention of static charges generated by friction or rubbing of the surface to which the treatment is applied. This simple expedient is not applicable to the present problem since an "antistat" coating upon either the adhesive face or the back side of the tape would interfere with the pressure-sensitive adhesive action and with the unwinding properties.

The desirability has been recognized for many years of eliminating objectionable static charging in pressure-sensitive tapes which are highly static-prone because they are insulative between the edges as to all layers or coatings thereof. So far as we are aware, we are the first to achieve this goal in a manner applicable to tapes of normal construction, without altering the physical and chemical characteristics of any layer or coating or functional surface and without interfering with the transparency and clarity of transparent tapes or the appearance of decorative tapes.

Surprisingly, we have discovered that a useful and commercially practical result can be obtained by use of antistatic edge coating means consisting of a thin flexible permanent conductive coating covering and firmly bonded to one or both of the side edges of the adhesive tape in the wound roll. A coating is chosen which is capable of being retained on the side edges as the adhesive tape is unwound, not separating or flaking off or making a ragged or rough edge. A suitable conductive metallic or carbon black edge coating can be used. An edge treatment which forms a conductive coating or surfacing by chemical, thermal or electrical action might be employed. We have found, however, that organic conductive coatings can be chosen which are more satisfactory and which can be formed or applied more simply and economically. This expedient does not interfere with the normal functioning of the tape for sealing, mending, holding or other usage, or with appearance, and does not interfere with the integrity of the tape structure or reduce its useful life.

Our preferred antistatic edge coatings consist essentially of a soft plastic or waxy organic composition including an ionic compound which is capable of providing adequate ionic antistatic conductivity, the composition being one that is capable of being applied as a solution which dries to deposit a continuous thin coating that is thick enough for conductivity and is firmly and permanently bonded to the edge, and which maintains an adequate moisture content (sufficient for ionic conductivity) under varying normal atmospheric conditions of about 25% relative humidity and higher to which tape rolls are exposed prior to and during use. A suitable coating composition can be a blend of a water-soluble organic polymer such as polyvinyl alcohol, a non-volatile humectant softener such as polypropylene glycol, and a soluble ionogen such as lithium chloride. Use can be made of a suitable quaternary ammonium compound and selection can be made from the wide variety of such compounds that have been marketed or proposed as antistatic agents.

The preferred edge coating material is selected from the class of water-soluble hydrophilic quaternary ammonium salts which form conductive coatings and have a sufficiently high molecular weight (of the order of 500 or higher) to be of a soft plastic or waxy but coherent consistency; preferably a hydroxylated quaternary ammonium salt of a fatty acid embraced by the generic formula:

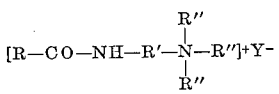

where R is a long alkyl group containing at least 12 carbon atoms such as the alkyl chain of a fatty acid, R' is a short alkylene bridging group containing two or more —$CH_2$— groups, R" are three N-bonded alkyl or hydroxy-alkyl groups having 1 to 3 carbon atoms, which may be the same or different but at least one of which is a hydroxy-alkyl group, and Y is an anion (such as Cl, Br or $NO_3$).

Antistatic quaternary ammonium compounds of the above type are disclosed in the patent of Cook and Moss No. 2,589,674 (March 18, 1952) and various usages as antistatic agents are described in the patent of Carnes No. 2,626,876 (Jan. 27, 1953).

The presently preferred species for our usage is: stearamidopropyldimethyl-beta - hydroxyethylammonium nitrate, having the formula:

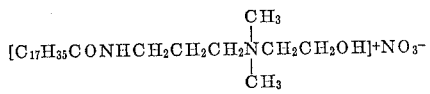

This composition, as a 50% solution in a 1:1 isopropyl alcohol-water mixture, is available from American Cyanamid Company as "Catanac" SN Antistatic Agent. It can be diluted for use with methyl, ethyl or isopropyl alcohol, or with water, or with a mixture. Dilution with water to a 20% solids concentration will provide a very satisfactory treating solution.

The treating solution can be readily applied (by brushing, padding or spraying) to one or both sides of wound rolls of adhesive tape to provide, upon drying, a continuous conductive coating which firmly and permanently adheres to the side edges of the tape convolutions. Such side coating of the roll with the preferred species of compound mentioned above, using a 20% solution, may be performed in a manner that results in a dried coating having an average thickness of about 20 microns. The waxy coating is sufficiently soft and low in internal strength to be cleanly and readily fracturable or tearable when the tape is unwound, so that the material will not separate from the edges of the tape, will not peel or flake, and will not form a rough or ragged edge on the unwound tape. It does not have or develop a sticky feeling even when exposed to high humidities, nor does it dry out or come off when exposed to dry air. The edge coating is moisture retentive and remains adequately conductive even when exposed to atmospheres having a relative humidity as low as about 25%. The electrical resistivity of an edge coating along an unwound strip does not exceed the order of $10^{10}$ ohms per centimeter when measured at 25% relative humidity. The conductive coating material does not evaporate, nor migrate into the tape structure, but retains its proper functioning for several months at least and the preferred type may be expected to retain its desired action for any normal expected life of the tape rolls between manufacture and use.

A very valuable feature of the present invention is that it provids an antistatic treatment that can be applied in conjunction with the tape slitting operation. In the manufacture of pressure-sensitive adhesive tapes of the type under discussion, a continuous wide web of backing film is subjected to successive coating operations whereby the adhesive coating and the primer and low-adhesion backsize coatings (if used), are applied. The dried web is wound into large "jumbo" rolls. These are subsequently unwound at a slitting machine, such as a "Cameron" slitter, where the web is slit by means of suitable rotary slitting knives which bear against a score roll, and the resultant tapes are wound upon cores in desired lengths to provide rolls of tape. It has been possible in the past to slit the web with knives that lubricate or plasticize the cut edges of the tapes, using one or more felt wicks rubbing against the rotary knives and dipping into a solution of treating material. This same expedient can be utilized to slit and simultaneously coat one or both edges of the tapes with the aforesaid antistatic coating composition, dissolved or dispersed in a volatile vehicle. These edge coatings dry so that the wound rolls from the slitting machine are ready for packaging.

Thus our invention provides an effective antistatic modification that is applicable to both transparent and opaque tapes having the same backings and same transverse area coatings thereon as before, and which does not require any additional or different type of equipment or any additional handling step during any stage of the entire manufacturing operation from starting materials to the ultimate packaged rolls of adhesive tape.

The cost of the treating material is quite low since the area of the side edge of a tape is small compared to the planar area. Typical film-backed mending, fastening and holding tapes have a total thickness of the order of only 2 to 3 mils (50 to 75 microns). As little as 5 pounds or less of dried edge coating material can suffice for both edges of one million lineal yards of such tape. An edge coating has a width (from face to face of the tape) approximately equal to the thickness of the tape, and has a thickness (in the plane of the tape) of the order of 20 microns or less. A useful result can be obtained when only one of the side edges of the tape is treated, particularly when the tape is of narrow width (¼ to 1 inch wide), but we prefer to coat both edges when the tape has a width greater than one-half inch and this is easily accomplished on the slitting machine. Very little is saved by coating only one edge and, in fact, thinner coatings can be used when both edges are coated. As noted above, use can be made of well-known commercially-available coating material.

Thus our invention can be utilized without adding more than a minute fraction of one percent to the cost of manufacturing a roll of adhesive tape, and the benefits vastly outweigh this trivial increase in cost.

Since the invention has general applicability to the class of pressure-sensitive adhesive tapes earlier designated, and as such tapes are well known and do not in themselves (apart from our antistatic edge treatment) constitute a part of this invention, there is no need for a detailed description of pressure-sensitive tape constructions.

Examples of thin water-insoluble hydrophobic insulative backing films are plasticized cellulose acetate films, rigid and semi-rigid polyvinyl chloride films, tensilized polyester films (generally made from a polymer of ethylene glycol or equivalent and terephthalic acid), polyethylene films, polypropylene films, polytetrafluoroethylene films, polychlorotrifluoroethylene films, etc.

Examples of hydrophobic rubbery insulative pressure-sensitive tape adhesives are the well known rubber-resin type (compounded of natural or synthetic rubber and a tackifier resin), and high polymers which are inherently of this adhesive type such as certain polyacrylates and certain polyvinyl alkyl ethers. As to the latter see, for instance, the disclosure of polyvinyl ether adhesives and tapes made therefrom in U.S. Patent 2,965,592 (Dec. 20, 1960), and the disclosure of polyacrylate adhesives and tapes made therefrom in U.S. Patents 2,884,126 (April 28, 1959), reissued as Re. 24,906, and 2,973,286 (Feb. 28, 1961). Tapes having a rigid polyvinyl chloride film backing are described in U.S. Patent 3,089,786 (May 14, 1963). Low-adhesion backsize coatings which are of a hydrophobic insulative nature are disclosed in U.S. Patent 2,532,011 (Nov. 28, 1950) dealing with polyurethanes and in U.S. Patent 2,607,711 (Aug. 19, 1952) dealing with polyacrylates; and their use is also described in the above-cited patents. The backing film may carry a primer coating, or be given an electrical or chemical priming treatment, to increase the firmness of bonding of the subsequently applied pressure-sensitive adhesive coating. As is well known, such priming is chosen with reference to the particular film-adhesive system. Examples are provided in the above patents.

Although the invention has its greatest commercial value in the field of pressure-sensitive adhesive tapes of the above-described type wherein a backing film carries a permanent coating of aggressively-tacky pressure-sensitive adhesive on one side, and which most commonly have a width in the range of ¼ to six inches, the invention is not limited thereto. Surprisingly, a useful antistatic effect is provided by our edge-coating technique even in the case of much wider adhesive tapes or sheets, up to a width of 48 inches or more, and even when only one edge is coated. The invention is useful in respect to rolls of low-tack adhesive tapes and sheets which lack the aggressive tackiness of sealing and packaging tapes; such as the so-called "protective" tapes and sheetings used for temporarily covering and protecting polished metal sheets, wherein a film backing carries a tacky rubber-resin type adhesive having a relatively low proportion of tackifier resin.

Another type of adhesive tape to which the invention applies is to rolls of pressure-sensitive adhesive transfer tapes wherein the adhesive coating is temporarily carried on a removable film liner, such as a polyethylene film. This tape, upon removal from the roll, can be laminated to another sheet material, or applied to any desired base, and the linear stripped off whenever desired to expose the tacky pressure-sensitive adhesive coating. An example of such tape is described in U.S. Patent 3,062,683 (Nov. 6, 1962).

Still another type of adhesive tape embraced by the invention is linerless double-coated pressure-sensitive tape wherein a film support (such as a thin rigid polyvinyl chloride film) is coated on both sides with adhesive, each coating being a rubbery pressure-sensitive adhesive, but the adhesives being chemically different and physically incompatible so that the tape can be readily unwound from a roll thereof despite direct contact of the tacky adhesive layers in the wound roll. Such tape is described in U.S. Patent 2,889,038 (June 2, 1959). Edge coatings in accordance with this invention can be provided in the same manner previously discussed in connection with ordinary tapes.

In all cases an antistatic edge-coating is employed on a normally tacky adhesive sheet (which term embraces "tape") which is wound upon itself in roll form and has a tacky rubbery adhesive layer whose facing surface is in removable adherent contact with a contiguous opposite facing surface of the sheet (which may itself be tacky as in the case of double-coated tape), these surfaces in any event being chemically different and force being required to unwind the sheet or tape and effect a separation of the surfaces. Each layer (or transverse coating) is electrically insulative between the side edges of the sheet or tape and such that without the antistatic edge coating means, objectionable static charging results upon removal from the roll. In all cases the antistatic edge coating means consists of a thin flexible permanent conductive coating firmly bonded to at least one of the side edges of the sheet or tape, and which is capable of being retained thereon upon unwinding.

EXAMPLE

This example illustrates the technique of applying antistatic edge coatings at the slitter during regular manufacture of commercial types of pressure-sensitive adhesive tape.

In this example a continuous wide backing film web of a transparent cellulose acetate film (plasticized with diethyl phthalate) having a thickness of 1.7 mils (43 microns) is provided on one face with an extremely thin low-adhesion backsize coating in a dry coating weight of approximately 0.1 pound per thousand square yards. This coating has a thickness of less than a micron. Use is made of an octadecyl acrylate copolymer type such as is disclosed in U.S. Patent 2,607,711 (Aug. 19, 1952).

The other side (face side) of the cellulose acetate film is provided with a pressure-sensitive adhesive coating consisting of an aggressively-tacky 95.5:4.5 copolymer of isooctyl acrylate and acrylic acid, the dry coating weight being approximately 40 pounds per thousand square yards to provide an adhesive coating having a thickness of approximately 0.9 mil (23 microns). This type of adhesive is described in U.S. Reissue Patent No. 24,906. In this instance no primer is used. The total thickness is thus approximately 2.6 mils (66 microns).

Use can be made of any slitting machine used in tape manufacture wherein the slitting is performed by rotary knives which bear against a score roll. An example is the well-known "Cameron" slitter. When slitting narrow tapes (such as tapes of ⅜ inch width) two sets of rotary knives in staggered relation may be used, but only one set needs to be used in applying the edge coating solution since, as previously mentioned, good results can be obtained with narrow tapes when only one edge is treated. A V-shaped trough parallel to the axis is positioned somewhat below and to one side of a set of rotary knives. A felt strip serves as a capillary wick and rests on the sloping side of the trough nearest the knives. It is adjusted so that when the treating solution is in the trough the longitudinal felt edge will just touch or "kiss" the peripheries of the rotating knives and transfer solution from the trough to the knives by capillary action. While the adhesive-coated film web is being slit between the rotary knives and the score roll, treating solution is wiped onto the edges of the tapes (either one or both edges of each tape depending on the arrangement). The wet coatings quickly dry as the slitted tapes are wound upon their cores so that the rolls of tape can be promptly packaged without any additional handling or processing step being needed. The coating weight and thickness can be regulated by adjusting the solids concentration in the coating solution.

The following is a presently preferred coating solution formulation:

| | Parts by weight |
|---|---|
| "Catanac" SN quaternary ammonium compound (dry basis) | 20 |
| Poly-ethylene glycol of approximately 400 molecular weight | 10 |
| Isopropyl alcohol | 10 |
| Water | 59 |
| Triethanolamine (used in proportion needed to buffer the solution to a pH value of 8.0 to 8.5) approximately | 1 |

In the above formula, the poly-ethylene glycol decreases the volatility of the solvent vehicle and serves to prevent caking of the composition in the felt and on the knives. Possibly this glycol may slowly migrate from an edge coating into the contiguous edge of the polyacrylate type of adhesive coating on the tape, but this will not impair the antistatic functioning of the edge coating nor is the amount sufficient to impair the adhesive functioning of the tape. Use of the buffering agent prevents rusting of the knives. The 10 parts of isopropyl alcohol, and 10 parts of the water, are provided by the "Catanac" SN solution as commercially supplied, which is a 50% solution of the quaternary ammonium compound in a 1:1 isopropyl alcholo/water mixed solvent. Thus 49 parts of water are added in effecting dilution to the 20% solids concentration of the quaternary ammonium compound used in this example. Tests on a variety of pressure-sensitive adhesive tapes employing various backing films and adhesives, all of which were edge-coated with the "Catanac" SN type of quaternary ammonium compound, showed that the the static charging tendency was completely, or to a worthwhile degree, overcome when tape rolls were exposed to atmospheres having relative humidities as low as 20% or even lower depending on the circumstances. When such tape rolls were aged under natural conditions for 18 months, and then tested, no material decrease in antistatic properties was observed. An accelerated aging test is to age a treated roll for two weeks at 120° F., allow the roll to reach equilibrium at room temperature in an atmosphere of predetermined relative humidity, and compare the static properties with a similarly treated tape roll which has not been heated. This test has shown no significant reduction in antistatic properties at relative humidities of 25% and higher, and a useful degree of antistatic action was exhibited at even lower relative humidities.

Likewise, tests have shown effective antistatic action and retention in the case of the previously mentioned pressure-sensitive transfer tapes, linerless double-coated pressure-sensitive tapes, and protective tapes and sheetings having a width up to 48 inches or more, when edge-coated with the "Catanac" SN type of quaternary ammonium compound. A useful effect is obtained when only one edge is treated but, as previously mentioned, the coating of both edges is preferred except in the case of narrow tapes.

We claim:

1. A normally tacky adhesive sheet wound upon itself in roll form, having a tacky rubbery adhesive layer whose facing surface is in removable adherent contact with the contiguous opposite facing surface of the sheet, these surfaces being chemically different and force being required to unwind the sheet and effect a separation of the surfaces; each layer of the adhesive sheet being electrically insulative between the side edges and such that without the antistatic means hereafter specified the removal of a piece of the sheet tends to produce objectionable static charging thereof; characterized by having in novel combination therewith antistatic edge coating means consisting of a thin flexible permanent conductive coating covering and firmly bonded to at least one of the side edges of the sheet and which is capable of being retained as the adhesive sheet is unwound from the roll and of substantially reducing static charging even when the adhesive sheet roll is exposed to an atmosphere having a relative humidity as low as about 25%.

2. The adhesive sheet roll of claim 1 wherein said antistatic edge coating is a soft plastic or waxy organic composition including an ionic compound which is capable of providing adequate ionic antistatic conductivity.

3. The adhesive sheet roll of claim 1 wherein said antistatic edge coating consists essentially of a waxy water-soluble hydrophilic quaternary ammonium compound which is capable of providing adequate ionic antistatic conductivity.

4. The adhesive sheet roll of claim 3 wherein said quaternary ammonium compound is selected from the class represented by the formula:

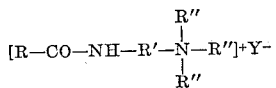

where R is a long alkyl group containing at least 12 carbon atoms, R' is a short alkylene bridging group, R'' are three N-bonded alkyl or hydroxy-alkyl groups having 1 to 3 carbon atoms, at least one of which is hydroxy-alkyl, and Y is an anion.

5. A pressure-sensitive adhesive tape wound upon itself in roll form and having a water-insoluble hydrophobic viscoelastic normally and aggressively tacky pressure-sensitive adhesive coating united to a hydrophobic film, said adhesive tape being electrically insulative between the side edges such that without the antistatic means hereafter specified the removal of a piece of tape from the wound roll tends to cause objectionable electrostatic charging thereof; characterized by having in novel combination therewith antistatic edge coating means consisting of a thin flexible permanent conductive coating covering and firmly bonded to at least one of the side edges of the tape and which is capable of being retained as the tape is unwound from the roll and of substantially reducing static charging even when the tape roll is exposed to an atmosphere having a relative humidity as low as about 25%.

6. The adhesive tape roll of claim 5 wherein said antistatic edge coating is a soft plastic or waxy organic composition including an ionic compound which is capable of providing adequate ionic antistatic conductivity.

7. The adhesive tape roll of claim 5 wherein said antistatic edge coating consists essentially of a waxy quaternary ammonium compound which is capable of providing adequate ionic antistatic conductivity.

8. The adhesive tape roll of claim 5 wherein said tape has a width in the range of ¼ to 6 inches and has an antistatic coating on both edges.

9. The adhesive tape roll of claim 5 wherein said tape has a width in the range of ¼ to 1 inch and has an antistatic coating on only one edge.

References Cited
UNITED STATES PATENTS

| | | | |
|---|---|---|---|
| 364,281 | 6/1887 | Ogden. | |
| 2,626,876 | 1/1953 | Carnes | 117—138.8 |
| 2,808,352 | 10/1957 | Coleman et al. | 117—227 |
| 3,224,889 | 12/1965 | Schulde et al. | 106—177 |
| 3,245,833 | 4/1966 | Trevoy | 117—201 |
| 3,272,648 | 9/1966 | Yamamoto | 117—139.5 |

WILLIAM D. MARTIN, *Primary Examiner.*

W. D. HERRICK, *Assistant Examiner.*